(12) United States Patent
Ramakrishnan

(10) Patent No.: US 12,604,119 B2
(45) Date of Patent: Apr. 14, 2026

(54) ADAPTIVE GAIN FOR IMAGE SENSORS

(71) Applicant: SEMICONDUCTOR COMPONENTS INDUSTRIES, LLC, Scottsdale, AZ (US)

(72) Inventor: Shankar Ramakrishnan, Bangalore (IN)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 52 days.

(21) Appl. No.: 18/668,363

(22) Filed: May 20, 2024

(65) Prior Publication Data

US 2025/0358546 A1 Nov. 20, 2025

(51) Int. Cl.
*H04N 25/78* (2023.01)
*H04N 25/77* (2023.01)

(52) U.S. Cl.
CPC ............. *H04N 25/78* (2023.01); *H04N 25/77* (2023.01)

(58) Field of Classification Search
CPC ............................... H04N 25/78; H04N 25/77
See application file for complete search history.

(56) References Cited

U.S. PATENT DOCUMENTS

| | | | |
|---|---|---|---|
| 9,661,251 B1 | 5/2017 | Eshel et al. | |
| 2017/0230599 A1* | 8/2017 | Abiru | H03M 1/82 |
| 2019/0082126 A1* | 3/2019 | Hisamatsu | H03K 4/00 |
| 2019/0166323 A1* | 5/2019 | Saito | G06T 7/55 |
| 2021/0351768 A1* | 11/2021 | Fan | H03M 1/007 |
| 2023/0254609 A1* | 8/2023 | Kosaka | H04N 23/71 |
| | | | 348/308 |
| 2023/0300488 A1* | 9/2023 | Suzuki | H10F 39/811 |
| 2024/0244343 A1* | 7/2024 | Kim | H04N 25/772 |

FOREIGN PATENT DOCUMENTS

CN 116249019 A1 6/2023

* cited by examiner

*Primary Examiner* — Nhan T Tran
(74) *Attorney, Agent, or Firm* — Dickinson Wright PLLC; Jonathan A. Schnayer

(57) ABSTRACT

Image sensors and methods for reading out image sensors. The image sensor includes a pixel array, a ramp generator, a gain circuit, a comparator, a digital counter, and a controller. The ramp generator is configured to generate a ramp signal. The gain circuit is configured to apply a first gain to the ramp signal when a pixel is reset and a selected gain to the ramp signal when the pixel is read out. The comparator is configured to compare a pixel output when the pixel is reset to the ramp signal. The comparator is also configured to compare the pixel output when the pixel is read out to the ramp signal. The digital counter is also configured to determine a digital signal value based on the outputs of the comparator. The controller is configured to determine a pixel value for the pixel based on the digital signal value.

17 Claims, 9 Drawing Sheets

700

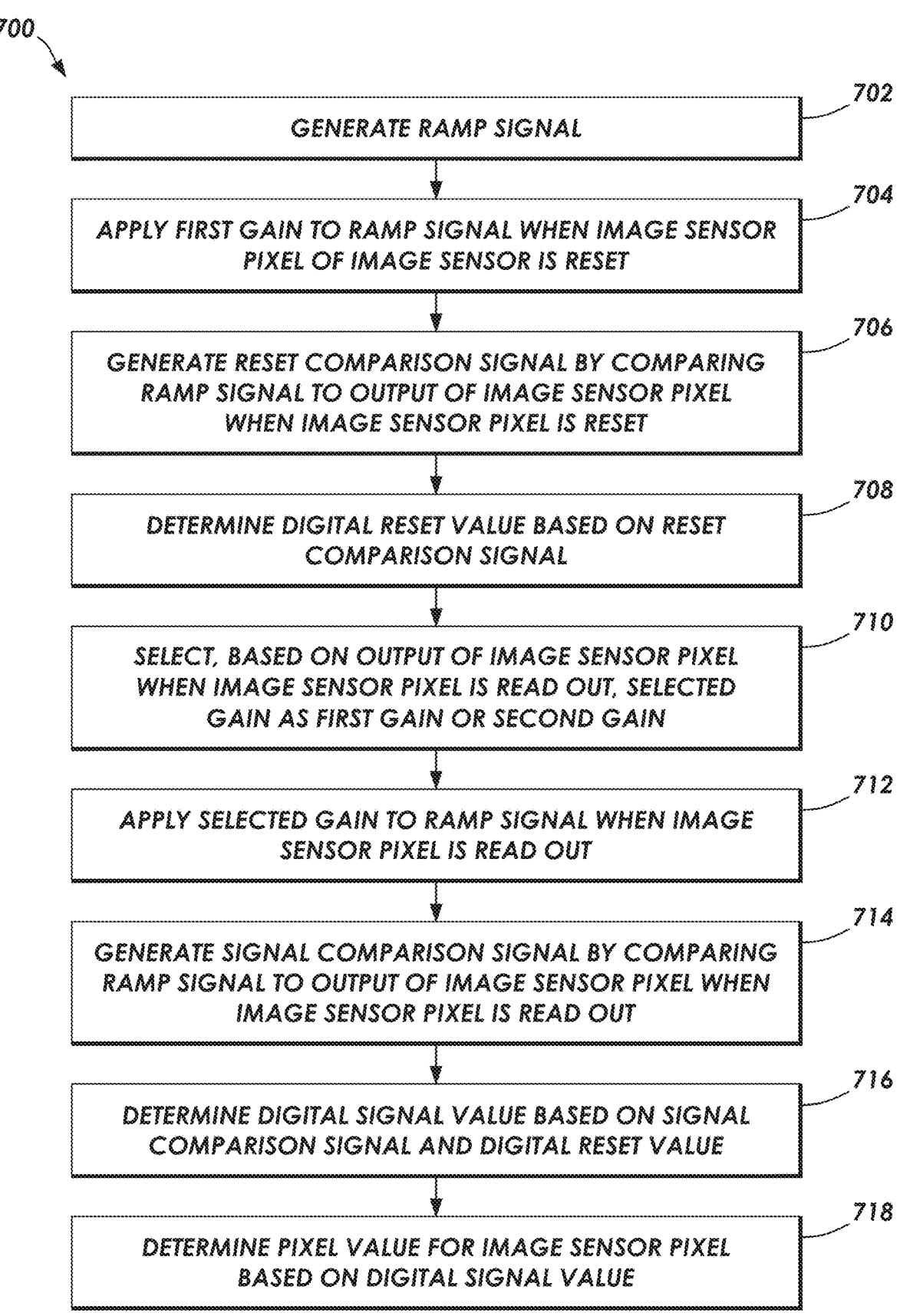

702 — GENERATE RAMP SIGNAL

704 — APPLY FIRST GAIN TO RAMP SIGNAL WHEN IMAGE SENSOR PIXEL OF IMAGE SENSOR IS RESET

706 — GENERATE RESET COMPARISON SIGNAL BY COMPARING RAMP SIGNAL TO OUTPUT OF IMAGE SENSOR PIXEL WHEN IMAGE SENSOR PIXEL IS RESET

708 — DETERMINE DIGITAL RESET VALUE BASED ON RESET COMPARISON SIGNAL

710 — SELECT, BASED ON OUTPUT OF IMAGE SENSOR PIXEL WHEN IMAGE SENSOR PIXEL IS READ OUT, SELECTED GAIN AS FIRST GAIN OR SECOND GAIN

712 — APPLY SELECTED GAIN TO RAMP SIGNAL WHEN IMAGE SENSOR PIXEL IS READ OUT

714 — GENERATE SIGNAL COMPARISON SIGNAL BY COMPARING RAMP SIGNAL TO OUTPUT OF IMAGE SENSOR PIXEL WHEN IMAGE SENSOR PIXEL IS READ OUT

716 — DETERMINE DIGITAL SIGNAL VALUE BASED ON SIGNAL COMPARISON SIGNAL AND DIGITAL RESET VALUE

718 — DETERMINE PIXEL VALUE FOR IMAGE SENSOR PIXEL BASED ON DIGITAL SIGNAL VALUE

*FIG. 7*

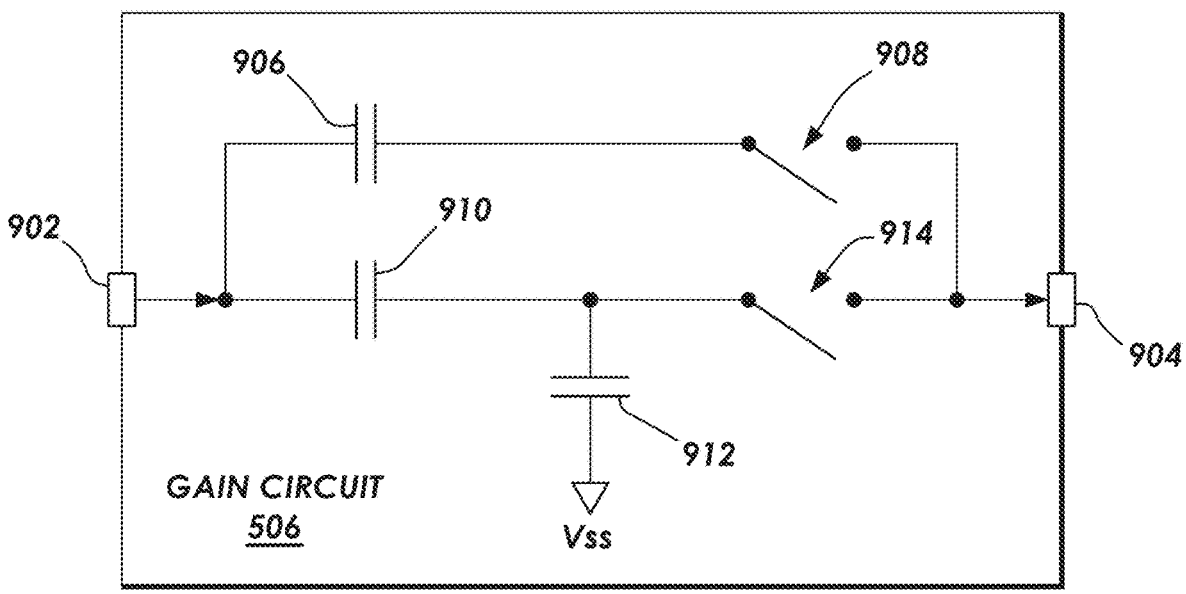
FIG. 9
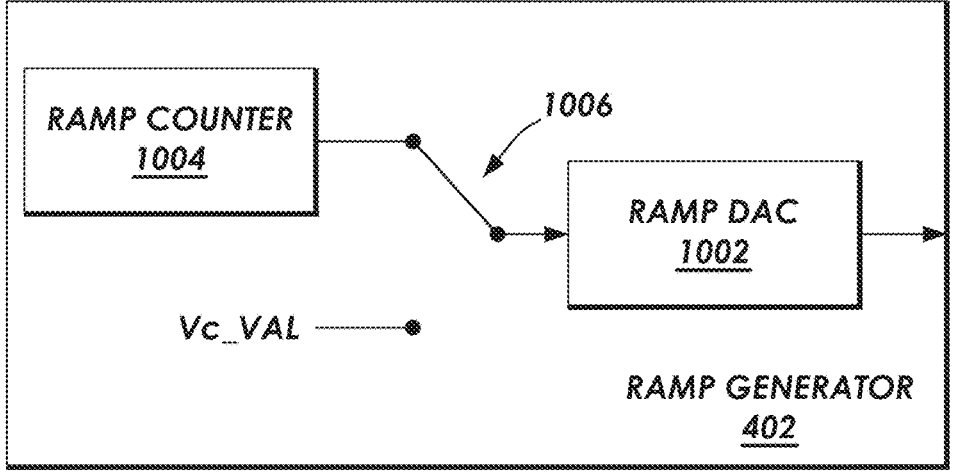
FIG. 10

ADAPTIVE GAIN FOR IMAGE SENSORS

BACKGROUND

Image sensors are used in electronic devices such as cellular telephones, cameras, and computers to capture images. In particular, an electronic device is provided with an array of image sensor pixels arranged in a grid pattern. Each image sensor pixel receives incident photons, such as light, and converts the photons into electrical signals. Column circuitry is coupled to each column for reading out sensor signals from each image sensor pixel.

SUMMARY

In complementary metal-oxide-semiconductor (CMOS) image sensors using ramp analog-to-digital converters (ADCs), analog gain is realized by attenuating the ramp. Attenuating the ramp lowers quantization error and ramp noise, leading to lower read noise. However, in doing so, the ADC output saturates at a fraction of the maximum pixel swing, depending on the gain. The full dynamic range of an image sensor pixel may be captured while still getting the benefit of reduced quantization noise by employing an adaptive gain methodology in the first readout of high dynamic range (HDR) imaging. Current ADC schemes employ large sampling capacitors which take up a lot of area and result in high power consumption. The present disclosure provides image sensors, imaging systems, and methods that, among other things, adapt the ramp ADC gain without sampling.

The present disclosure provides an image sensor including, in one implementation, a pixel array, a ramp generator, a gain circuit, a comparator, a digital counter, and a controller. The ramp generator is configured to generate a ramp signal. The gain circuit is configured to apply a first gain to the ramp signal when an image sensor pixel of the pixel array is reset. The gain circuit is also configured to apply a selected gain to the ramp signal when the image sensor pixel is read out. The comparator is configured to generate a reset comparison signal by comparing an output of the image sensor pixel when the image sensor pixel is reset to the ramp signal. The comparator is also configured to generate a signal comparison signal by comparing the output of the image sensor pixel when the image sensor pixel is read out to the ramp signal. The digital counter is configured to determine a digital reset value based on the reset comparison signal. The digital counter is also configured to determine a digital signal value based on the signal comparison signal and the digital reset value. The controller is configured to select, based on the output of the image sensor pixel when the image sensor pixel is read out, the selected gain as the first gain or a second gain. The controller is also configured to determine a pixel value for the image sensor pixel based on the digital signal value.

The present disclosure also provides an image sensor including, in one implementation, a pixel array, a ramp generator, a plurality of column analog-to-digital converters (ADCs), and a controller. The pixel array is arranged in a plurality of rows and a plurality of columns. The ramp generator is configured to generate a ramp signal. Each of the plurality of column ADCs is coupled to a plurality of image sensor pixels included in one of the plurality of columns of the pixel array. Each of the plurality of column ADCs is configured to apply a first gain to the ramp signal when one of the plurality of image sensor pixels is reset. Each of the plurality of column ADCs is also configured to generate a reset comparison signal by comparing the ramp signal to an output of the one of the plurality of image sensor pixels when the one of the plurality of image sensor pixels is reset. Each of the plurality of column ADCs is further configured to determine a digital reset value based on the reset comparison signal. Each of the plurality of column ADCs is also configured to apply a selected gain to the ramp signal when the one of the plurality of image sensor pixels is read out. Each of the plurality of column ADCs is further configured to generate a signal comparison signal by comparing the ramp signal to the output of the one of the plurality of image sensor pixels when the one of the plurality of image sensor pixels is read out. Each of the plurality of column ADCs is also configured to determine a digital signal value based on the signal comparison signal and the digital reset value. The controller is configured to select, based on the output of the one of the plurality of image sensor pixels when the one of the plurality of image sensor pixels is read out, the selected gain as the first gain or a second gain. The controller is also configured to determine a pixel value for the one of the plurality of image sensor pixels based on the digital signal value.

The present disclosure further provides a method for reading out an image sensor. The method includes generating a ramp signal. The method also includes applying a first gain to the ramp signal when an image sensor pixel of the image sensor is reset. The method further includes generating a reset comparison signal by comparing the ramp signal to an output of the image sensor pixel when the image sensor pixel is reset. The method also includes determining a digital reset value based on the reset comparison signal. The method further includes selecting, based on the output of the image sensor pixel when the image sensor pixel is read out, a selected gain as the first gain or a second gain. The method also includes applying the selected gain to the ramp signal when the image sensor pixel is read out. The method further includes generating a signal comparison signal by comparing the ramp signal to the output of the image sensor pixel when the image sensor pixel is read out. The method also includes determining a digital signal value based on the signal comparison signal and the digital reset value. The method further includes determining a pixel value for the image sensor pixel based on the digital signal value.

BRIEF DESCRIPTION OF THE DRAWINGS

For a detailed description of example implementations, reference will now be made to the accompanying drawings in which:

FIG. 7 is a flow diagram of an example of a method for reading out an image sensor with adaptive gain in accordance with some implementations;

FIG. 9 is a schematic of an example of circuitry in a gain circuit in accordance with some implementations; and FIG. 10 is a partial schematic and a partial block diagram of an example of circuitry in a ramp generator in accordance with some implementations.

DEFINITIONS

Figure 1A:
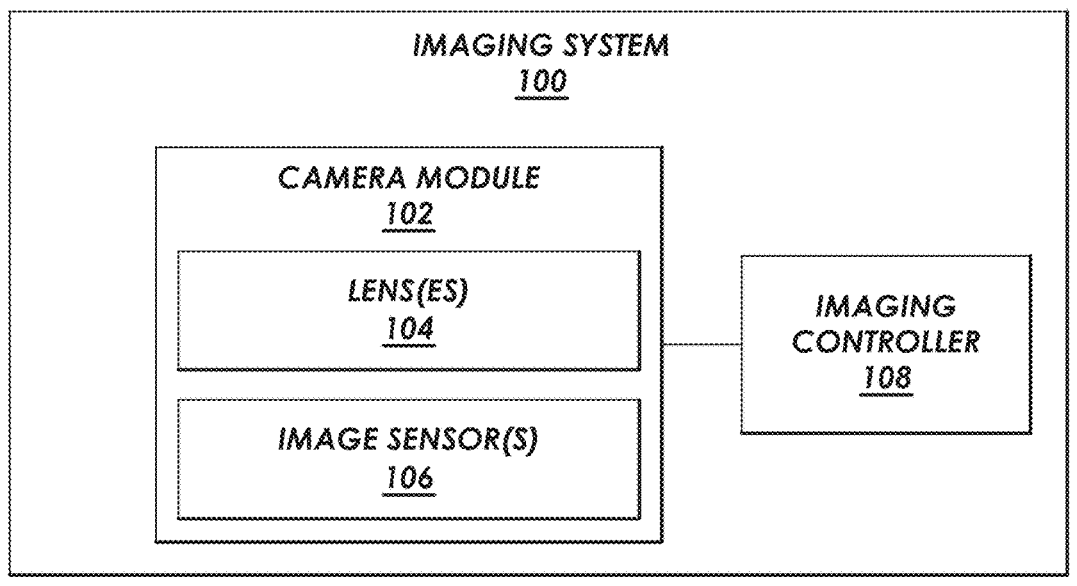
FIG. 1A is a block diagram of an example of an imaging system in accordance with some implementations.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

Terms defining an elevation, such as "above," "below," "upper", and "lower" shall be locational terms in reference to a direction of light incident upon a pixel array and/or an image pixel. Light entering shall be considered to interact with or pass objects and/or structures that are "above" and "upper" before interacting with or passing objects and/or structures that are "below" or "lower." Thus, the locational terms may not have any relationship to the direction of the force of gravity.

In relation to electrical devices, whether stand alone or as part of an integrated circuit, the terms "input" and "output" refer to electrical connections to the electrical devices, and shall not be read as verbs requiring action. For example, a differential amplifier, such as an operational amplifier, may have a first differential input and a second differential input, and these "inputs" define electrical connections to the operational amplifier, and shall not be read to require inputting signals to the operational amplifier.

"Controller" shall mean, alone or in combination, individual circuit components, an application specific integrated circuit (ASIC), one or more microcontrollers with controlling software, a reduced-instruction-set computer (RISC) with controlling software, a digital signal processor (DSP), one or more processors with controlling software, a programmable logic device (PLD), a field programmable gate array (FPGA), or a programmable system-on-a-chip (PSOC), configured to read inputs and drive outputs responsive to the inputs.

DETAILED DESCRIPTION

The following discussion is directed to various implementations of the invention. Although one or more of these implementations may be preferred, the implementations disclosed should not be interpreted, or otherwise used, as limiting the scope of the present disclosure, including the claims. In addition, one skilled in the art will understand that the following description has broad application, and the discussion of any implementation is meant only to be exemplary of that implementation, and not intended to intimate that the scope of the present disclosure, including the claims, is limited to that implementation.

Various examples are directed to systems and methods for determining pixel signals with digital correlated double sampling (DCDS). More particularly, various examples are directed to imaging systems that improve the dynamic range of the first readout of high dynamic range (HDR) imaging by switching between two gains depending on the signal level. More particularly still, various examples are directed to imaging systems and related controllers that correct digital signal values to account for the offset that occurs when different gains are used to determine a DCDS value. The specification now turns to an example system to orient the reader.

FIG. 1A shows an example of an imaging system 100. In particular, the imaging system 100 may be a portable electronic device such as a camera, a cellular telephone, a tablet computer, a webcam, a video camera, a video surveillance system, or a video gaming system with imaging capabilities. In other cases, the imaging system 100 may be an automotive imaging system. The imaging system 100 illustrated in FIG. 1A includes a camera module 102 that may be used to convert incoming light into digital image data. The camera module 102 may include one or more lenses 104 and one or more corresponding image sensors 106. The lenses 104 may include fixed and/or adjustable lenses. During image capture operations, light from a scene may be focused onto the image sensor 106 by the lenses 104. The image sensor 106 may comprise circuitry for converting analog pixel data into corresponding digital image data to be provided to the imaging controller 108. If desired, the camera module 102 may be provided with an array of lenses 104 and an array of corresponding image sensors 106.

The imaging controller 108 may include one or more integrated circuits. The imaging circuits may include image processing circuits, microprocessors, and storage devices, such as random-access memory, and non-volatile memory. The imaging controller 108 may be implemented using components that are separate from the camera module 102 and/or that form part of the camera module 102, for example, circuits that form part of the image sensor 106. Digital image data captured by the camera module 102 may be processed and stored using the imaging controller 108. Processed image data may, if desired, be provided to external equipment, such as computer, external display, or other device, using wired and/or wireless communications paths coupled to the imaging controller 108.

Figure 1B:
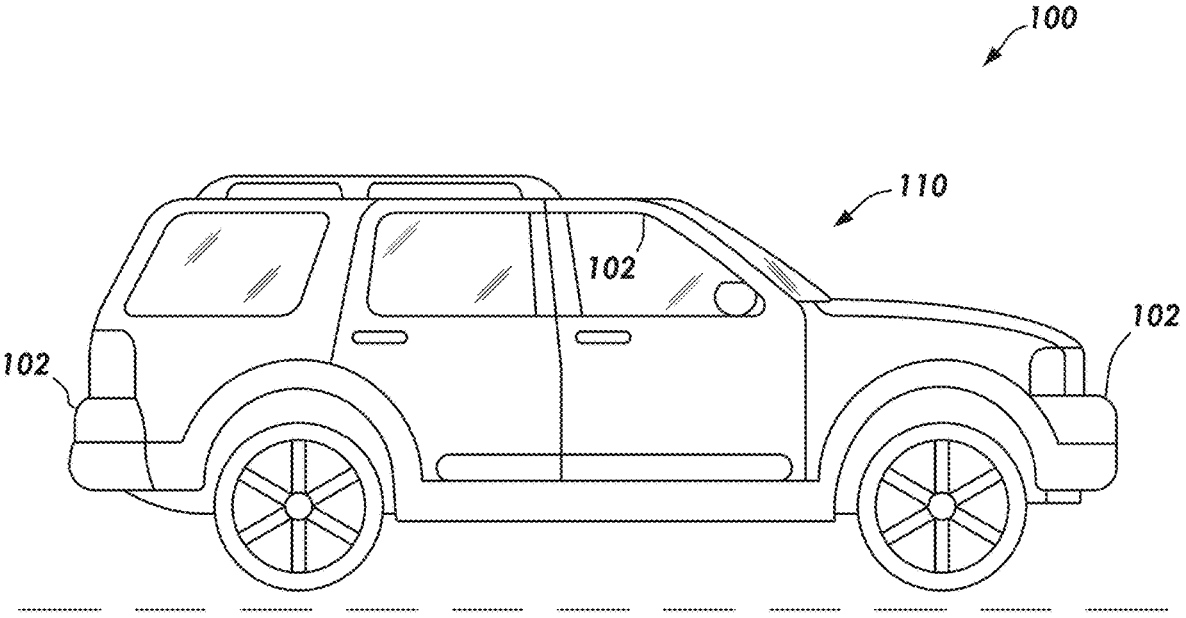
FIG. 1B is a diagram of an example of an imaging system incorporated in a vehicle in accordance with some implementations.

FIG. 1B shows another example of the imaging system 100. The imaging system 100 illustrated in FIG. 1B comprises an automobile or vehicle 110. The vehicle 110 is illustratively shown as a passenger vehicle, but the imaging system 100 may be other types of vehicles, including commercial vehicles, on-road vehicles, and off-road vehicles. Commercial vehicles may include busses and tractor-trailer vehicles. Off-road vehicles may include tractors and crop harvesting equipment. In the example of FIG. 1B, the vehicle 110 includes a forward-looking camera module 102 arranged to capture images of scenes in front of the vehicle 110. Such a forward-looking camera module 102 can be used for any suitable purpose, such as lane-keeping assist, collision warning systems, distance-pacing cruise-control systems, autonomous driving systems, and proximity detection. The vehicle 110 further comprises a backward-looking camera module 102 arranged to capture images of scenes behind the vehicle 110. Such a backward-looking camera module 102 can be used for any suitable purpose, such as collision warning systems, reverse direction video, autonomous driving systems, proximity detection, monitoring position of overtaking vehicles, and backing up. The vehicle 110 further comprises a side-looking camera module 102 arranged to capture images of scenes beside the vehicle 110. Such a side-looking camera module 102 can be used for any suitable purpose, such as blind-spot monitoring, collision warning systems, autonomous driving systems, monitoring position of overtaking vehicles, lane-change detection, and proximity detection. In situations in which the imaging system 100 is a vehicle, the imaging controller 108 may be a controller of the vehicle 110. The discussion now turns in greater detail to the image sensor 106 of the camera module 102.

Figure 2:
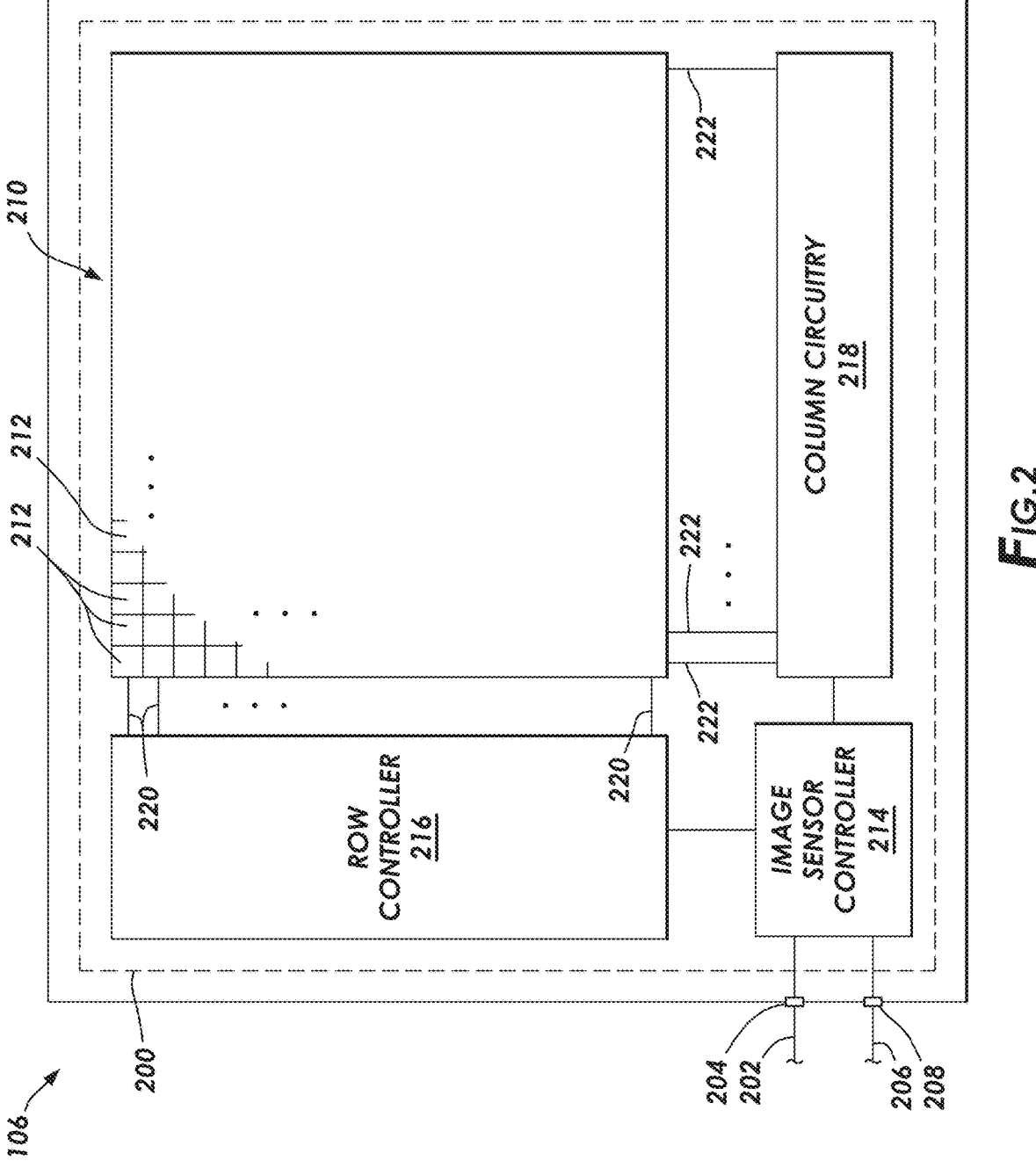
FIG. 2 is a partial schematic and a partial block diagram of an example of an image sensor in accordance with some implementations.

FIG. 2 shows an example of the image sensor 106. In particular, FIG. 2 shows that the image sensor 106 may comprise a substrate 200 of semiconductor material (for example, silicon) encapsulated within packaging to create a packaged semiconductor device or packaged semiconductor product. Bond pads or other connection points of the substrate 200 couple to terminals of the image sensor 106, such as a serial communication channel 202 coupled to a first terminal 204, and a capture input 206 coupled to a second terminal 208. Additional terminals will be present, such as ground, common, or power, but the additional terminals are omitted so as not to unduly complicate the figure. While a single instance of the substrate 200 is shown, in other implementations, multiple substrates may be combined to form the image sensor 106 in a multi-chip module.

The image sensor 106 illustrated in FIG. 2 includes a pixel array 210 with a plurality of image sensor pixels 212 arranged in rows and columns. The pixel array 210, being one example of an "array of pixels," may include, for example, hundreds or thousands of rows and columns of image sensor pixels 212. Control and readout of the pixel array 210 may be implemented by an image sensor controller 214 coupled to a row controller 216 and column circuitry 218. The row controller 216 may receive row addresses from the image sensor controller 214 and supply corresponding row control signals to image sensor pixels 212, such as reset, row-select, charge transfer, dual conversion gain, and readout control signals. The row control signals may be communicated over one or more conductors, such as row control paths 220.

The column circuitry 218 may be coupled to the pixel array 210 by way of one or more conductors, such as column lines 222. Column circuitry may sometimes be referred to as column control circuits, readout circuits, or column decoders. The column lines 222 may be used for reading out pixel signals from image sensor pixels 212 and for supplying bias currents and/or bias voltages to image sensor pixels 212. If desired, during pixel readout operations, a pixel row in the pixel array 210 may be selected using the row controller 216 and pixel signals generated by image sensor pixels 212 in that pixel row can be read out along the column lines 222. The column circuitry 218 converts analog pixel values received from the pixel array 210 into corresponding digital image data. The column circuitry 218 may also supply digital image data to the image sensor controller 214 and/or the imaging controller 108 (FIG. 1A) over, for example, the serial communication channel 202.

Figure 3:
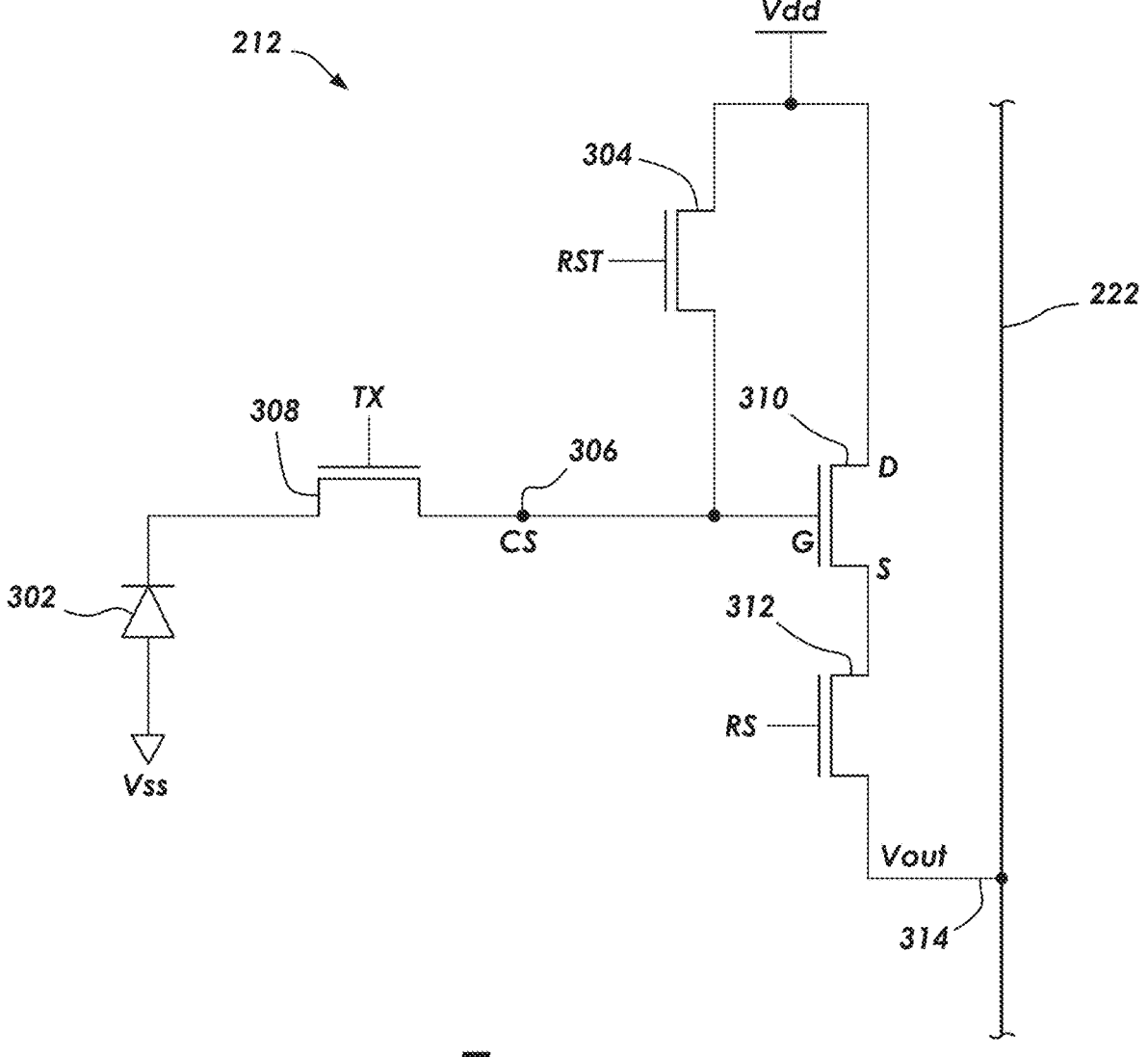
FIG. 3 is a schematic of an example of circuitry in an image sensor pixel in accordance with some implementations.

FIG. 3 shows an example of circuitry in one of the image sensor pixels 212. The image sensor pixels 212 may have fewer components, additional components, or different components in different configurations than the one illustrated in FIG. 3. In particular, FIG. 3 shows that each of the image sensor pixels 212 may comprise a photodetector 302 (for example, a photodiode). A positive pixel power supply voltage, such as supply voltage Vdd, may be supplied at a positive power supply terminal. A ground power supply voltage, such a reference voltage Vss, may be supplied at a ground terminal. Incoming light is gathered by the photodetector 302, in some cases after the light passes through a color filter structure (not shown). The photodetector 302 converts the light to electrical charge.

Before an image is acquired, a reset control signal RST may be asserted. The reset control signal RST turns on a reset transistor 304 and resets a charge storage (CS) node 306 to a voltage equal or close to the supply voltage Vdd. The reset control signal RST may then be de-asserted to turn off the reset transistor 304. After the reset process is complete, a transfer gate control signal TX may be asserted to turn on a transfer transistor 308. When the transfer transistor 308 is turned on, charge generated by the photodetector 302 in response to incoming light is transferred to the charge storage node 306. The charge storage node 306 exhibits a capacitance that can be used to store the charge that has been transferred from the photodetector 302. The signal associated with the charge stored in the charge storage node 306 is buffered by a source-follower transistor 310. A row select transistor 312 connects the source-follower transistor 310 to one of the column lines 222.

When it is desired to read out the value of the charge stored in the charge storage node 306, a control signal RS is asserted. The signal at the source terminal S of the source-follower transistor 310 represents the magnitude of charge stored in the charge storage node 306. The read-out value may be, for example, the signal at the source terminal S of the source-follower transistor 310. When the control signal RS is asserted, the row select transistor 312 is made conductive and an output signal Vout that is representative of the magnitude of the charge stored in the charge storage node 306 is produced on an output path 314. The output signal Vout is inversely related to the amount of light detected by the photodetector 302. For example, the output signal Vout is higher when dim light is detected and lower when bright light is detected. The output signal Vout is one example of a "pixel signal." When the control signal RS is asserted, one of the column lines 222 can be used to route the output signal Vout from the image sensor pixel 212 to readout circuitry, such as the column circuitry 218 in FIG. 2.

Figure 4:
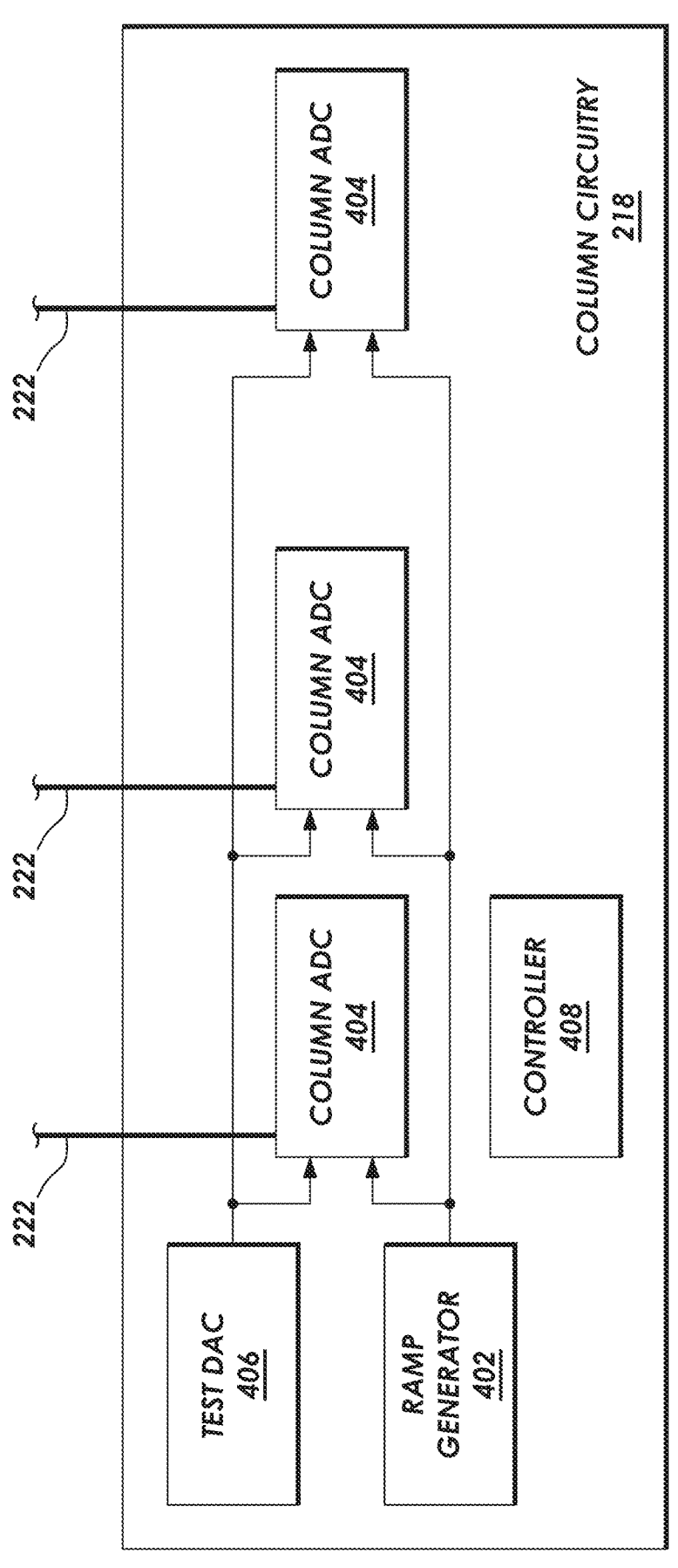
FIG. 4 is a block diagram of an example of column circuitry in accordance with some implementations.

FIG. 4 is a block diagram of an example of the column circuitry 218. The column circuitry 218 illustrated in FIG. 4 includes a ramp generator 402, a plurality of column analog-to-digital converters (ADCs) 404, a test digital-to-analog converter (DAC) 406, and a controller 408. The column circuitry 218 may have fewer components, additional components, or different components in different configurations than the one illustrated in FIG. 4. The ramp generator 402 is coupled to the each of the column ADCs 404. The ramp generator 402 is configured to generate and provide a ramp signal to each of the column ADCs 404. Each of the column ADCs 404 is coupled to one of the column lines 222. Each of the column ADCs 404 is configured to measure the output of one of the image sensor pixels 212, and convert the measured output to a digital value. The test DAC 406 is configured to generated test voltages for calibrating the column ADCs 404, as will be described in more detail later in the detailed description. The operation of the controller 408 will also be described in more detail later in the detailed description.

Figure 5:
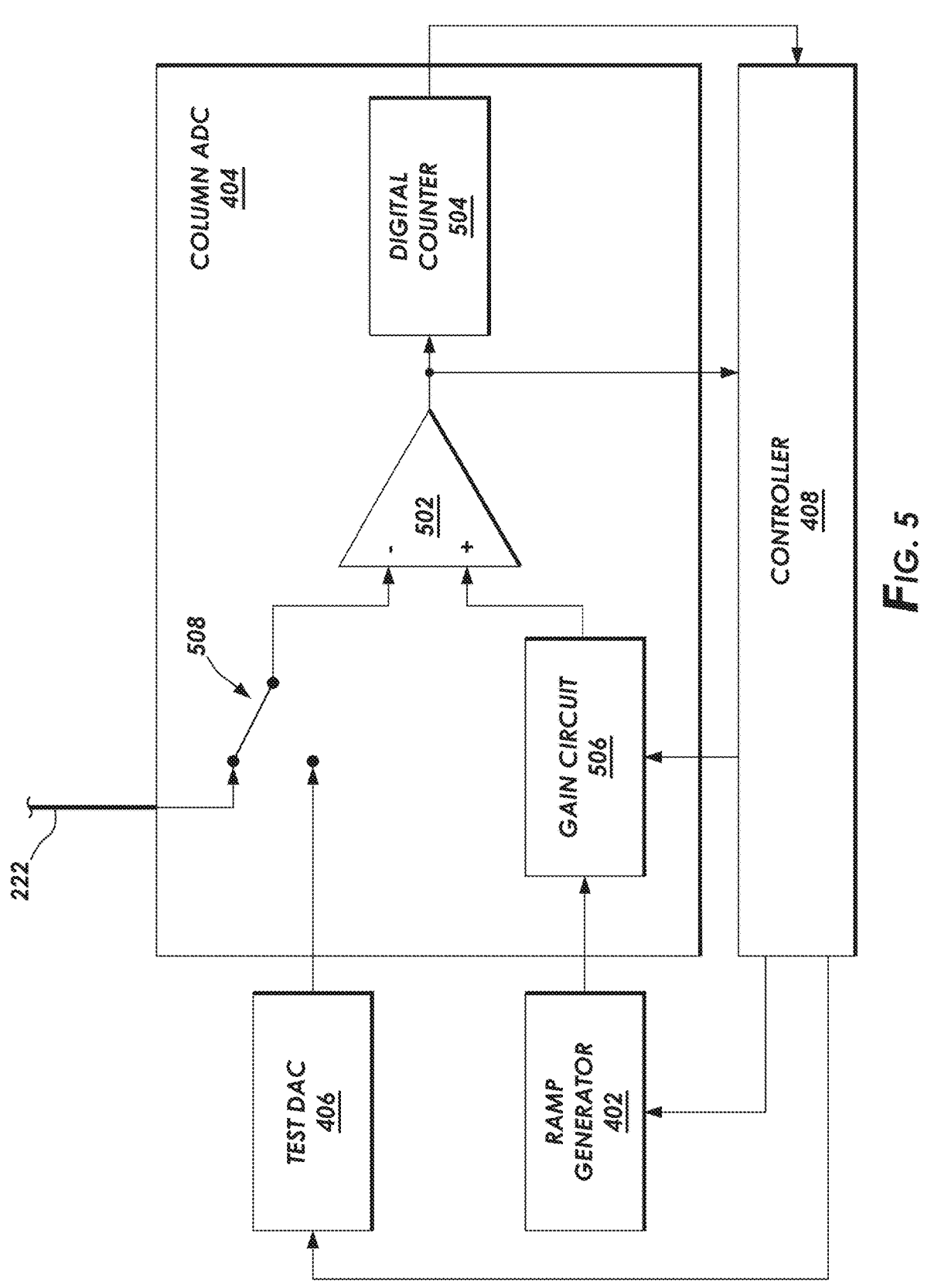
FIG. 5 is a partial schematic and a partial block diagram of an example of circuitry in a column analog-to-digital converter in accordance with some implementations.

FIG. 5 shows an example of circuitry in one of the column ADCs 404. The column ADC 404 illustrated in FIG. 5 includes a comparator 502, a digital counter 504, a gain circuit 506, and a switch 508. Each of the column ADCs 404 may have fewer components, additional components, or different components in different configurations than the one illustrated in FIG. 5. For example, one of the column lines 222 may be capacitively coupled to the comparator 502 via a coupling capacitor (not shown) connected between the switch 508 and the inverting input of the comparator 502.

The comparator 502 is configured to compare, among other things, the output of one of the image sensor pixels 212 to a ramp signal generated by the ramp generator 402. In FIG. 5, the comparator 502 is illustrated as a non-inverting amplifier. However, the comparator 502 may include other types of comparators. The inverting input of the comparator 502 is coupled to one of the column lines 222 via the switch 508. As described above, the output of each column of image sensor pixels 212 in the pixel array 210 are coupled to one of the column lines 222. Thus, the inverting input of the comparator 502 receives output signals Vout from the image sensor pixels 212 via one of the column lines 222. The non-inverting input of the comparator 502 is coupled to the ramp generator 402 via the gain circuit 506.

The ramp signal generated by the ramp generator 402 is an analog signal that begins at a high level and then decreases substantially linearly as a function of time from the high level. While the ramp signal decreases as one of the image sensor pixels 212 is reset, the digital counter 504 counts down from a reset value while monitoring the output of the comparator 502 so as to stop counting when the comparator 502 changes state. At this point, the stopped count value is one example of a digital reset value corresponding to the output signal Vout of the image sensor pixel 212 when the pixel is reset. As used herein, "when the pixel is reset" refers to a period of time after the reset transistor 304 of the pixel is turned off and before the transfer transistor 308 of the pixel is turned on. Further, while the ramp signal decreases as one of the image sensor pixels 212 is read out, the digital counter 504 counts up from its current value while monitoring the output of the comparator 502 so as to stop counting when the comparator 502 changes state. At this point, the stopped count value is one example of a digital signal value corresponding to the output signal Vout of the image sensor pixel 212 when the pixel is read out. As used herein, "when the pixel is read out" refers to a period of time after the transfer transistor 308 is turned off. The digital signal value is one example of a pixel value which is representative of an accumulated charge in the pixel. This process may be referred to as DCDS.

Figure 6:
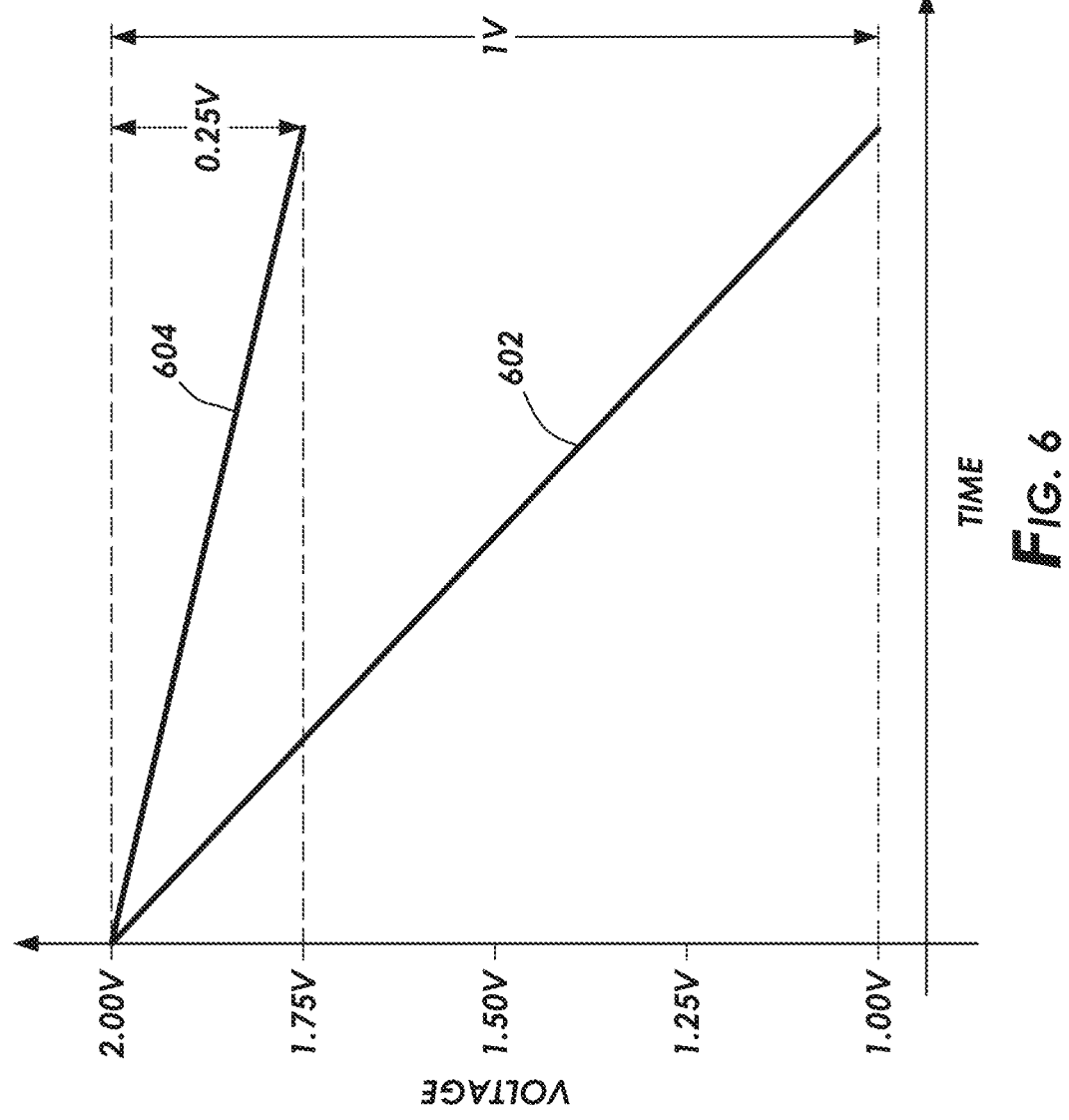
FIG. 6 is a plot of examples of a low gain ramp signal and a high ramp signal in accordance with some implementations.

As described above, the non-inverting input of the comparator 502 is coupled to the ramp generator 402 via the gain circuit 506. The gain circuit 506 applies a gain to the ramp signal by attenuating the slope of the ramp signal. For example, FIG. 6 is a plot of a first ramp signal 602 with unity gain applied and a second ramp signal 604 with a gain of 4 applied. As illustrated in FIG. 6, the slope of the second ramp signal 604 is smaller than the slope of the first ramp signal 602. Further, as described above, output signals Vout generated by the image sensor pixels 212 are inversely related to the amount of light detected. Thus, as a result of the smaller slope, the second ramp signal 604 provides higher resolution to convert low-light output signals Vout from the image sensor pixels 212. However, also as a result of the smaller slope, the pixel swing of the second ramp signal 604 is smaller than the pixel swing of the first ramp signal 602. For example, as illustrated in FIG. 6, the pixel swing of the first ramp signal 602 is 1 Volt, and the full scale input of the column ADC 404 is also 1 Volt because unity gain is applied to the first ramp signal 602. However, as illustrated in FIG. 6, the pixel swing of the second ramp signal is 0.25 Volts, and thus, the output of the column ADC 404 will saturate when the second ramp signal 604 is used and the pixel output is less than 1.75 Volts. In other words, the column ADC 404 cannot provide output values representing the amount of bright light detected by the image sensor pixels 212 when the gain circuit 506 applies a high gain to the ramp signal generated by the ramp generator 402. Thus, in this example of FIG. 6, the usable well capacity of the charge storage node 306 is only one-fourth of the linear full well capacity when the second ramp signal 604 is used, which may represent a loss of about 12 decibels of dynamic range in the first readout. In high dynamic range (HDR) imaging, the second readout may make up for this loss, but the second readout may only restore the original dynamic range of the image sensor pixel 212. Thus, two readouts would be needed to obtain the same dynamic range of a single readout when ramp attenuation is not used.

To capture the full dynamic range of each of the image sensor pixels 212 and still get the benefits of lower read noise, the gain circuit 506 is configured to apply different amounts of gain to the ramp signal. FIG. 7 is a flow diagram of an example of a method 700 for reading out the image sensor 106 with adaptive gain in accordance with some implementations. For simplicity of explanation, the method 700 is depicted in FIG. 7 and described as a series of operations. However, the operations can occur in various orders and/or concurrently, and/or with other operations not presented and described herein.

At block 702, a ramp signal is generated, for example, by the ramp generator 402. At block 704, a first gain is applied to the ramp signal when an image sensor pixel 212 of the image sensor 106 is reset. For example, the gain circuit 506 may apply a high gain to the ramp signal generated by the ramp generator 402 when the image sensor pixel 212 is reset. At block 706, a reset comparison signal is generated by comparing the ramp signal to an output of the image sensor pixel 212 when the image sensor pixel 212 is reset. For example, the comparator 502 may generate a reset comparison signal that changes state when the output of the image sensor pixel 212 matches the ramp signal. At block 708, a digital reset value is determined based on the reset comparison signal. For example, the digital reset value may be determined based on the stopped count value of the digital counter 504 when the reset comparison signal changes state.

At block 710, a selected gain is selected as the first gain or a second gain based on the output of the image sensor pixel 212 when the image sensor pixel 212 is read out. In some implementations, the gain circuit 506 may apply a high gain or a low gain to the ramp signal based on the voltage level of the output signal Vout generated by the image sensor pixel 212 when the pixel is read out. As described above, the output signals Vout generated by the image sensor pixels 212 are inversely related to the amount of light detected. Thus, the gain circuit 506 may apply a gain of 1 (i.e., unity gain) when the voltage of the output signal Vout generated by the image sensor pixel 212 is greater than a predetermined threshold voltage and apply a gain greater than 1 when the voltage of the output signal Vout is less than or equal to the predetermined threshold voltage. In some implementations, the predetermined threshold voltage is between about 90 percent to 95 percent of the ADC full scale when the first gain (for example, a high gain) is applied.

In some implementations, the comparator 502 may compare the output of the image sensor pixel 212 to the predetermined threshold voltage. For example, the switch 508 and one of the column lines 222 may couple the inverting input of the comparator 502 to the output path 314 of one of the image sensor pixels 212 after the transfer transistor 308 of the pixel is turned on. Further, the ramp generator 402 may generate the predetermined threshold voltage to apply to the non-inverting input of the comparator 502. Based on the output of the comparator 502, the controller 408 may determine whether the voltage of the output signal Vout generated by the image sensor pixel 212 is greater than or less than the predetermined threshold voltage. Based on that determination, the controller 408 may set the gain circuit 506 to apply either the first gain or the second gain.

Returning to the method 700, at block 712, the selected gain is applied to the ramp signal when the image sensor pixel 212 is read out. For example, the gain circuit 506 may apply the selected gain to the ramp signal generated by the ramp generator 402 when the image sensor pixel 212 is read out. At block 714, a signal comparison signal is generated by comparing the ramp signal to an output of the image sensor pixel 212 when the image sensor pixel 212 is read out. For example, the comparator 502 may generate a signal comparison signal that changes state when the output of the image sensor pixel 212 matches the ramp signal. At block 716, a digital signal value is determined based on the signal comparison signal and the digital reset value. For example, the digital signal value may be determined based on the stopped count value of the digital counter 504 when the signal comparison signal changes state.

At block 718, a pixel value for the image sensor pixel 212 is determined based on the digital signal value. In situations where the same gain is applied for reset and read out, the pixel value is determined as the digital signal value. For example, the pixel value may be set the digital signal value when a high gain is applied for both reset and read out. However, in situations where the different gains are applied for reset and read out, the digital signal value must be corrected to account for the difference between the high gain and the low gain.

Figure 8:
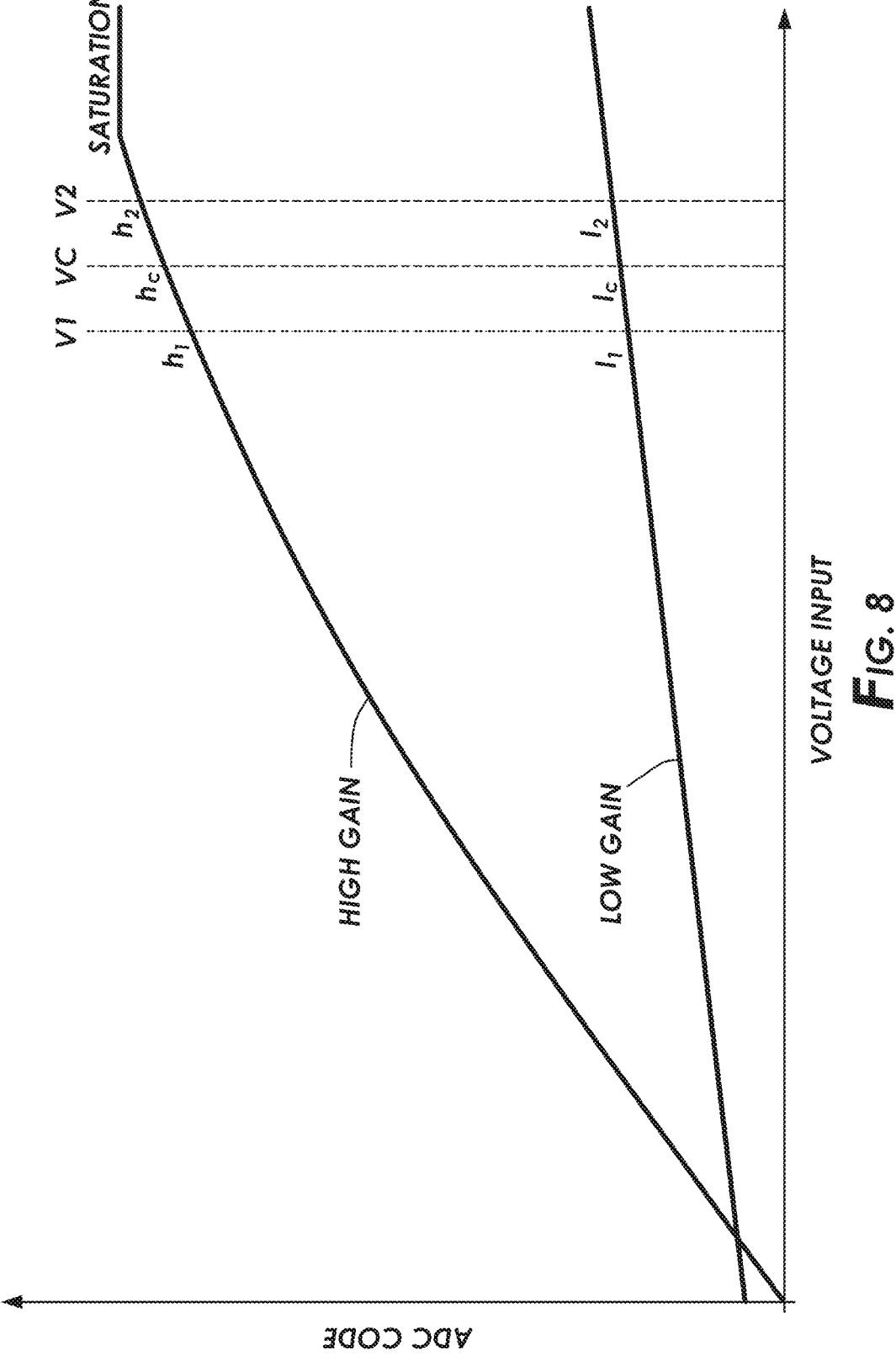
FIG. 8 is a plot of examples of analog-to-digital codes resulting from different input levels for a high gain ramp signal and a low gain ramp signal in accordance with some implementations.

FIG. 8 is a plot of examples of ADC codes resulting from different input levels for a high gain ramp signal and a low gain ramp signal. As illustrated in FIG. 8, the slopes of the two ramps are different. As also illustrated in FIG. 8, the slope difference between the two ramps causes an offset between them. As described above, in DCDS, the digital reset value is subtracted from the digital signal value to determine a pixel value which is representative of accumulated charge in the image sensor pixel 212. However, when different gains are applied to the ramp signal to generate the digital reset value and the digital signal value, the comparator 502 will switch at different times for the two gains, causing an offset in the subtracted value even when the input is the same for the digital reset value and the digital signal value. The offset causes errors in the final DCDS value obtained by subtracting the digital reset value from the digital signal value. Further, the offset may vary from column to column as well as over process, voltage, and temperature variations. To address the offset that occurs when different gains are used, the present disclosure determines a corrected digital signal value that accounts for the offset.

The imaging system 100 may determine a corrected digital signal value based on an offset between the first gain and the second gain and a ratio between the first gain and the second gain. For example, the imaging system 100 may determine a corrected digital signal value using Equation 1 shown below:

$$V_{cor}(i) = R \times V_{signal}(i) + V_{offset} \qquad \text{Equation 1}$$

wherein:

$V_{cor}(i)$ = corrected digital signal value, $R$ = ratio between the first gain and the second gain, $V_{signal}(i)$ = digital signal value, and $V_{offset}$ = offset between the first gain and the second gain.

To determine the ratio between the first gain and the second gain, the imaging system 100 performs four calibration row read outs. During a first calibration row readout, the comparator 502 compares a predetermined low voltage to the ramp signal when the first gain (for example, a high gain) is applied. In some implementations, the predetermined low voltage is about five percent to ten percent less than the predetermined threshold voltage. In FIG. 8, an example of the predetermined first voltage is labeled as V1 and an example of the predetermined threshold voltage is labeled as VC. In some implementations, the predetermined low voltage is generated by the test DAC 406. The test DAC 406 may be coupled to the inverting input of the comparator 502 via the switch 508. The comparator 502 may generate a first test signal that changes state when the ramp signal matches the predetermined low voltage. The digital counter 504 may determine a first digital test value based on the first test signal. For example, the first digital test value may be determined based on the stopped count value of the digital counter 504 when the first test signal changes state. The controller 408 may determine a first calibration value by summing all (or a subset of) the first digital test values $h_1$ determined for each column of the pixel array 210.

During a second calibration row readout, the comparator 502 compares the predetermined low voltage to the ramp signal when the second gain (for example, a low gain) is applied. The comparator 502 may generate a second test signal that changes state when the ramp signal matches the predetermined low voltage. The digital counter 504 may determine a second digital test value based on the second test signal. For example, the second digital test value $I_1$ may be determined based on the stopped count value of the digital counter 504 when the second test signal changes state. The controller 408 may determine a second calibration value by summing all (or a subset of) the second digital test values $I_1$ determined for each column of the pixel array 210.

During a third calibration row readout, the comparator 502 compares a predetermined high voltage to the ramp signal when the first gain (for example, a high gain) is applied. In some implementations, the predetermined high voltage is up to about ten percent greater than the predetermined threshold voltage. In some implementations, the predetermined high voltage is substantially the same as the predetermined threshold voltage. In FIG. 8, an example of the predetermined second voltage is labeled as V2. In some implementations, the predetermined high voltage is generated by the test DAC 406. The comparator 502 may generate a third test signal that changes state when the ramp signal matches the predetermined high voltage. The digital counter 504 may determine a third digital test value $h_2$ based on the third test signal. For example, the third digital test value may be determined based on the stopped count value of the digital counter 504 when the third test signal changes state. The controller 408 may determine a third calibration value by summing all (or a subset of) the third digital test values determined for each column of the pixel array 210.

During a fourth calibration row readout, the comparator 502 compares the predetermined high voltage to the ramp signal when the second gain (for example, a low gain) is applied. The comparator 502 may generate a fourth test signal that changes state when the ramp signal matches the predetermined high voltage. The digital counter 504 may determine a fourth digital test value based on the fourth test signal. For example, the fourth digital test value may be determined based on the stopped count value of the digital counter 504 when the fourth test signal changes state. The controller 408 may determine a fourth calibration value by summing all (or a subset of) the fourth digital test values determined for each column of the pixel array 210.

The imaging system 100 determines the ratio between the first gain and the second gain based on the first calibration value, the second calibration value, the third calibration value, and the fourth calibration value. For example, the imaging system 100 may determine the ratio using Equation 2 shown below:

$$R = (H_2 - H_1)/(L_2 - L_1) \qquad \text{Equation 2}$$

wherein:

$R$ = ratio between the first gain and the second gain, $H_2$ = third calibration value, $H_1$ = first calibration value, $L_2$ = fourth calibration value, and $L_1$ = second calibration value.

To determine the offset between the first gain and the second gain, the imaging system 100 performs two additional calibration row read outs. During a fifth calibration row readout, the comparator 502 compares the predetermined threshold voltage to the ramp signal when the first gain (for example, a high gain) is applied. In some implementations, the predetermined threshold voltage is generated by the test DAC 406. The comparator 502 may generate a fifth test signal that changes state when the ramp signal matches the predetermined threshold voltage. The digital counter 504 may determine a fifth calibration value based on the fifth test signal. For example, the fifth calibration value may be determined based on the stopped count value of the digital counter 504 when the fifth test signal changes state. The controller 408 may store the fifth calibration values determined for each column of the pixel array 210 in a one-dimensional register.

During a sixth calibration row readout, the comparator 502 compares the predetermined threshold voltage to the ramp signal when the second gain (for example, a low gain) is applied. The comparator 502 may generate a sixth test signal that changes state when the ramp signal matches the predetermined threshold voltage. The digital counter 504 may determine a sixth calibration value based on the sixth test signal. For example, the sixth calibration value may be determined based on the stopped count value of the digital counter 504 when the sixth test signal changes state.

The imaging system 100 determines the offset between the first gain and the second gain on a column-by-column basis based on the ratio between the first gain and the second gain, the fifth digital test value, and the sixth digital test value. For example, the imaging system 100 may determine the offset using Equation 3 shown below:

$$V_{offset} = h_c - R \times l_c \qquad \text{Equation 3}$$

wherein:

$V_{offset}$ = offset between the first gain and the second gain, $h_c$ = fifth calibration value, $R$ = ratio between the first gain and the second gain, and $l_c$ = sixth calibration value.

The controller 408 may store the sixth calibration values determined for each column of the pixel array 210 in a one-dimensional register. In some implementations, the controller 408 may store the sixth calibration values in the same one-dimensional register in which the fifth calibration values are stored.

The calibration cycle described above may be performed periodically (for example, once every frame, once per a predetermined number of frames, etc.).

When different gains are used to determine the digital reset value and the digital signal value, the pixel value is determined based on the ratio and the offset between the first gain and the second gain. For example, when a high gain is used to determine the digital reset value and a low gain is used to determine the digital signal value, the imaging system 100 may determine the pixel value using Equation 4 below:

$$V_{DCDS} = R \times V_{signal} + V_{offset} \qquad \text{Equation 4}$$

wherein:

$V_{DCDS}$ = pixel value, $R$ = ratio between the first gain and the second gain, $V_{signal}$ = digital signal value, and $V_{offset}$ = offset between the first gain and the second gain.

Alternatively, when the same gain is used to determine the digital reset value and the digital signal value, the pixel value is determined as the digital signal value. For example, when a high gain is used to determine the digital reset value and the digital signal value, the imaging system 100 may set the pixel value to the digital signal value.

FIG. 9 shows an example of circuitry in the gain circuit 506. The gain circuit 506 illustrated in FIG. 9 includes an input terminal 902, an output terminal 904, a first capacitor 906, a first switch 908, a second capacitor 910, a third capacitor 912, and a second switch 914. The gain circuit 506 may have fewer components, additional components, or different components in different configurations than the one illustrated in FIG. 9. The input terminal 902 is coupled to the output of the ramp generator 402. The output terminal 904 is coupled to the comparator 502 (for example, the non-inverting input of the comparator 502). The first capacitor 906 and the first switch 908 are coupled in a series configuration between the input terminal 902 and the output terminal 904. The second capacitor 910 and the third capacitor 912 are coupled in a series configuration between the input terminal 902 and a reference terminal. Together, the second capacitor 910 and the third capacitor 912 form a capacitive voltage divider. The second switch 914 is coupled between the output of the capacitive voltage divider and the output terminal 904.

Together, the first capacitor 906 and the first switch 908 form a first gain path. Further, the second capacitor 910, the third capacitor 912, and the second switch 914 form a second gain path. To apply the second gain (for example, a low gain) to the ramp signal, the first switch 908 is set closed and the second switch 914 is set open. Alternatively, to apply the first gain (for example, a high gain) to the ramp signal, the first switch 908 is set open and the second switch 914 is set closed.

When the first switch 908 is set closed and the second switch 914 is set open, the first capacitor 906 capacitively couples the output of the ramp generator 402 to the non-inverting input of the comparator 502. Thus, the gain circuit 506 of FIG. 9 outputs a signal to the comparator 502 that substantially matches the ramp signal generated by the ramp generator 402 when the first gain path is used. For example, the gain circuit 506 of FIG. 9 may generate the first ramp signal 602 of FIG. 6 when the first gain path is used. Further, when the first switch 908 is set open and the second switch 914 is set closed, the second capacitor 910 capacitively couples the output of the ramp generator 402 to the non-inverting input of the comparator 502. However, the capacitive voltage divider formed by the second capacitor 910 and the third capacitor 912 attenuates the slope of the ramp signal generated by the ramp generator 402. Thus, the gain circuit 506 of FIG. 9 outputs a signal to the comparator 502 that is higher than the ramp signal generated by the ramp generator 402 when the second gain path is used. For example, the gain circuit 506 of FIG. 9 may generate the second ramp signal 604 of FIG. 6 when the second gain path is used. As illustrated in FIG. 6, the second ramp signal 604 is higher than the first ramp signal 602.

FIG. 10 shows an example of circuitry in the ramp generator 402. The ramp generator 402 illustrated in FIG. 10 includes a ramp DAC 1002, a ramp counter 1004, and a switch 1006. The ramp generator 402 may have fewer components, additional components, or different components in different configurations than the one illustrated in FIG. 10. The ramp DAC 1002 is configured to generate the ramp signal based on the output of the ramp counter 1004. When the ramp generator 402 is generating the ramp signal, the switch 1006 couples the ramp DAC 1002 to the output of the ramp counter 1004. Alternatively, when the ramp generator 402 is generating the predetermined threshold voltage, the switch 1006 couples the ramp DAC 1002 to a predetermined threshold value signal $V_C$_VAL associated with the predetermined threshold voltage.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various implementations of the present invention. Numerous variations and modifications will become apparent to those skilled in the art once the above disclosure is fully appreciated. It is intended that the following claims be interpreted to embrace all such variations and modifications.

What is claimed is:

1. An image sensor, comprising:
a pixel array;
a ramp generator including:
    a ramp digital-to-analog converter (DAC) configured to generate a ramp signal,
    a ramp counter, and
    a switch configured to selectively couple the ramp DAC to the ramp counter or a predetermined threshold value signal associated with a predetermined threshold voltage;
a gain circuit configured to:
    apply a first gain to the ramp signal when an image sensor pixel of the pixel array is reset, and
    apply a selected gain to the ramp signal when the image sensor pixel is read out;
a comparator configured to:
    generate a reset comparison signal by comparing an output of the image sensor pixel when the image sensor pixel is reset to the ramp signal, and
    generate a signal comparison signal by comparing the output of the image sensor pixel when the image sensor pixel is read out to the ramp signal;
a digital counter configured to:
    determine a digital reset value based on the reset comparison signal, and
    determine a digital signal value based on the signal comparison signal and the digital reset value; and
a controller configured to:
    select, based on the output of the image sensor pixel when the image sensor pixel is read out, the selected gain as the first gain or a second gain, and
    determine a pixel value for the image sensor pixel based on the digital signal value.

2. The image sensor of claim 1, wherein the comparator is further configured to generate a gain comparison signal by comparing the output of the image sensor pixel when the image sensor pixel is read out to the predetermined threshold voltage, and
wherein, to select, based on the output of the image sensor pixel when the image sensor pixel is read out, the selected gain as the first gain or the second gain, the controller is further configured to:
    select the first gain as the selected gain when the gain comparison signal indicates that the output of the image sensor pixel is greater than the predetermined threshold voltage, and
    select the second gain as the selected gain when the gain comparison signal indicates that the output of the image sensor pixel is less than or equal to the predetermined threshold voltage.

3. The image sensor of claim 1, wherein, to determine the pixel value for the image sensor pixel based on the digital signal value, the controller is further configured to:
    determine the pixel value for the image sensor pixel by adding an offset between the first gain and the second gain to a product of the digital signal value and a ratio between the first gain and the second gain.

4. The image sensor of claim 3, wherein the comparator is further configured to:
    generate a first test signal by comparing a predetermined low voltage to the ramp signal when the first gain is applied,
    generate a second test signal by comparing the predetermined low voltage to the ramp signal when the second gain is applied, generate a third test signal by comparing a predetermined high voltage to the ramp signal when the first gain is applied, and generate a fourth test signal by comparing the predetermined high voltage to the ramp signal when the second gain is applied, wherein the digital counter is further configured to:

determine a first digital test value based on the first test signal, determine a second digital test value based on the second test signal, determine a third digital test value based on the third test signal, and determine a fourth digital test value based on the fourth test signal, and wherein the controller is further configured to determine the ratio between the first gain and the second gain based on the first digital test value, the second digital test value, the third digital test value, and the fourth digital test value.

5. The image sensor of claim 4, wherein the comparator is further configured to:

generate a fifth test signal by comparing the predetermined threshold voltage to the ramp signal when the first gain is applied, and generate a sixth test signal by comparing the predetermined threshold voltage to the ramp signal when the second gain is applied, wherein the digital counter is further configured to:

determine a fifth digital test value based on the fifth test signal, and determine a sixth digital test value based on the sixth test signal, and wherein the controller is further configured to determine the offset between the first gain and the second gain as a difference between the fifth digital test value and a product of the sixth digital test value and the ratio between the first gain and the second gain.

6. The image sensor of claim 5, further comprising:

a test digital-to-analog converter (DAC) configured to generate the predetermined low voltage, the predetermined high voltage, and the predetermined threshold voltage; and a switching module configured to selectively couple the comparator to the image sensor pixel or the test DAC.

7. The image sensor of claim 1, wherein the gain circuit includes:

an input terminal coupled to the ramp generator, an output terminal coupled to the comparator, a first gain path between the input terminal and the output terminal, wherein the first gain path includes:

a first capacitor, and a first switch coupled in a series configuration with the first capacitor, and a second gain path between the input terminal and the output terminal, wherein the second gain path includes:

a second capacitor, a second switch coupled in the series configuration with the second capacitor, and a third capacitor coupled between the second capacitor and a reference terminal.

8. The image sensor of claim 1, wherein the second gain is one, and wherein the first gain is greater than the second gain.

9. An image sensor, comprising:

a pixel array arranged in a plurality of rows and a plurality of columns;

a ramp generator configured to generate a ramp signal;

a plurality of column analog-to-digital converters (ADCs), wherein each of the plurality of column ADCs is coupled to a plurality of image sensor pixels included in one of the plurality of columns of the pixel array, wherein each of the plurality of column ADCs is configured to:

apply a first gain to the ramp signal when one of the plurality of image sensor pixels is reset, generate a reset comparison signal by comparing the ramp signal to an output of the one of the plurality of image sensor pixels when the one of the plurality of image sensor pixels is reset, determine a digital reset value based on the reset comparison signal, apply a selected gain to the ramp signal when the one of the plurality of image sensor pixels is read out, generate a signal comparison signal by comparing the ramp signal to the output of the one of the plurality of image sensor pixels when the one of the plurality of image sensor pixels is read out, and determine a digital signal value based on the signal comparison signal and the digital reset value; and a controller configured to:

select, based on the output of the one of the plurality of image sensor pixels when the one of the plurality of image sensor pixels is read out, the selected gain as the first gain or a second gain, and determine a pixel value for the one of the plurality of image sensor pixels by adding an offset between the first gain and the second gain to a product of the digital signal value and a ratio between the first gain and the second gain.

10. The image sensor of claim 9, wherein each of the plurality of column ADCs is further configured to generate a gain comparison signal by comparing a predetermined threshold voltage to the output of the one of the plurality of image sensor pixels when the one of the plurality of image sensor pixels is read out, and wherein, to select, based on the output of the one of the plurality of image sensor pixels when the one of the plurality of image sensor pixels is read out, the selected gain as the first gain or the second gain, the controller is further configured to:

select the first gain as the selected gain when the gain comparison signal indicates that the output of the one of the plurality of image sensor pixels is greater than the predetermined threshold voltage, and select the second gain as the selected gain when the gain comparison signal indicates that the one of the one of the plurality of image sensor pixels is less than or equal to the predetermined threshold voltage.

11. The image sensor of claim 9, wherein each of the plurality of column ADCs is further configured to:

determine a first digital test value by comparing a predetermined low voltage to the ramp signal when the first gain is applied, determine a second digital test value by comparing the predetermined low voltage to the ramp signal when the second gain is applied, determine a third digital test value by comparing a predetermined high voltage to the ramp signal when the first gain is applied, and determine a fourth digital test value by comparing the predetermined high voltage to the ramp signal when the second gain is applied, and wherein the controller is further configured to:

determine a first calibration value by summing the first digital test value determined by each of the plurality of column ADCs, determine a second calibration value by summing the second digital test value determined by each of the plurality of column ADCs, determine a third calibration value by summing the third digital test value determined by each of the plurality of column ADCs, determine a fourth calibration value by summing the fourth digital test value determined by each of the plurality of column ADCs, and determine the ratio between the first gain and the second gain by dividing a first difference between the third calibration value and the first calibration value by a second difference between the fourth calibration value and the second calibration value.

12. The image sensor of claim 11, wherein each of the plurality of column ADCs is further configured to:

determine a fifth calibration value by comparing a predetermined threshold voltage to the ramp signal when the first gain is applied, and determine a sixth calibration value by comparing the predetermined threshold voltage to the ramp signal when the second gain is applied, and wherein the controller is further configured to determine the offset between the first gain and the second gain as a difference between the fifth calibration value and a product of the sixth calibration value and the ratio between the first gain and the second gain.

13. The image sensor of claim 9, wherein the second gain is unity, and wherein the first gain is greater than the second gain.

14. A method for reading out an image sensor, the method comprising:

generating a ramp signal;

applying a first gain to the ramp signal when an image sensor pixel of the image sensor is reset;

generating a reset comparison signal by comparing the ramp signal to an output of the image sensor pixel when the image sensor pixel is reset;

determining a digital reset value based on the reset comparison signal;

selecting, based on the output of the image sensor pixel when the image sensor pixel is read out, a selected gain as the first gain or a second gain;

applying the selected gain to the ramp signal when the image sensor pixel is read out;

generating a signal comparison signal by comparing the ramp signal to the output of the image sensor pixel when the image sensor pixel is read out;

determining a digital signal value based on the signal comparison signal and the digital reset value; and determining a pixel value for the image sensor pixel by adding an offset between the first gain and the second gain to a product of the digital signal value and a ratio between the first gain and the second gain.

15. The method of claim 14, further comprising:

generating a gain comparison signal by comparing a predetermined threshold voltage to the output of the image sensor pixel when the image sensor pixel is read out, and wherein selecting, based on the output of the image sensor pixel when the image sensor pixel is read out, the selected gain as the first gain or the second gain further comprises:

selecting the first gain as the selected gain when the gain comparison signal indicates that the output of the image sensor pixel is greater than the predetermined threshold voltage, and selecting the second gain as the selected gain when the gain comparison signal indicates that the output of the image sensor pixel is less than or equal to the predetermined threshold voltage.

16. The method of claim 14, further comprising:

generating a first test signal by comparing a predetermined low voltage to the ramp signal when the first gain is applied;

generating a second test signal by comparing the predetermined low voltage to the ramp signal when the second gain is applied;

generating a third test signal by comparing a predetermined high voltage to the ramp signal when the first gain is applied;

generating a fourth test signal by comparing the predetermined high voltage to the ramp signal when the second gain is applied; and determining the ratio between the first gain and the second gain based on the first test signal, the second test signal, the third test signal, and the fourth test signal.

17. The method of claim 16, further comprising:

generating a fifth test signal by comparing a predetermined threshold voltage to the ramp signal when the first gain is applied; and generating a sixth test signal by comparing the predetermined threshold voltage to the ramp signal when the second gain is applied; and determining the offset between the first gain and the second gain based on the fifth test signal, the sixth test signal, and the ratio between the first gain and the second gain.

* * * * *